United States Patent [19]

Grover

[11] Patent Number: 4,482,004

[45] Date of Patent: Nov. 13, 1984

[54] WASTE HEAT BOILER

[75] Inventor: George M. Grover, Los Alamos, N. Mex.

[73] Assignee: Qdot Corporation, Garland, Tex.

[21] Appl. No.: 849,987

[22] Filed: Nov. 9, 1977

[51] Int. Cl.³ ..................... F28D 15/00; F22B 3/02
[52] U.S. Cl. ................................ 165/1; 122/33; 165/103; 165/104.14; 165/108; 165/47
[58] Field of Search ............... 165/105, 103, DIG. 12, 165/1, 104.14, 108; 122/33

[56] References Cited

U.S. PATENT DOCUMENTS

| | | | |
|---|---|---|---|
| 1,524,520 | 1/1925 | Junbers | 165/146 |
| 2,153,942 | 4/1939 | Spalding, Jr. | 165/146 X |
| 3,018,087 | 1/1962 | Steele | 165/105 |
| 3,779,310 | 12/1973 | Russell | 122/33 X |
| 3,854,454 | 12/1974 | Lazaridis | 122/33 |
| 4,040,477 | 8/1977 | Garberick | 165/105 X |

FOREIGN PATENT DOCUMENTS 18365 of 1894 United Kingdom ................. 122/33

Primary Examiner—Albert W. Davis, Jr.
Attorney, Agent, or Firm—Hubbard, Thurman Turner & Tucker

[57] ABSTRACT

A system for recovering waste heat from a stream of heated gas is disclosed. The system includes a convection heat transfer chamber, a boiler tank, and a plurality of heat pipes thermally interconnecting the convection heat transfer chamber with the boiler tank. Each of the heat pipes includes an evaporator section which is disposed in heat transfer relation with a stream of heated gas flowing through the convection heat transfer chamber, and a condenser section disposed in heat transfer relation with a volume of water disposed within the boiler tank. The evaporator sections and condenser sections are totally enclosed within the convection heat transfer chamber and boiler tank, respectively, and are connected in closed cycle fluid communication with each other. The heat pipes contain a working fluid which is characterized by a thermodynamic cycle in which the working fluid is vaporized in the evaporator section and flows to the condenser section where it is condensed to the liquid phase and returns in a closed cycle to the evaporator section, thereby transferring heat energy from the heated gas stream in the convection heat transfer chamber to the volume of water contained in the boiler tank. In a regenerative arrangement, exhaust gas discharged from the convection heat transfer chamber is recycled to the input of the convection heat transfer chamber to provide high mass flow at low velocity for optimum efficiency. In another arrangement, superheated steam is provided by a pair of heat pipe boilers whose convection heat transfer chambers are connected in series, with the evaporator of the steam generating unit being located downstream of the superheated unit and the input of the superheat unit being the steam output of the steam generating unit.

7 Claims, 6 Drawing Figures

WASTE HEAT BOILER

BACKGROUND OF THE INVENTION

1. Field of the Invention:

The present invention relates generally to heat exchange systems, and in particular, to a gas-to-water heat recovery system which utilizes an array of heat pipes for collecting heat from a stream of heated gas and transferring the heat into a volume of water for the production of steam.

2. Description of the Prior Art:

Heat recovery from industrial waste gas sources presents an ever increasing opportunity for economical operation of thermal systems. The economic advantage from any form of heat recovery depends upon the availability and cost of fuels. Obviously, savings from heat recovery increase as fuel costs rise. As the cost of energy constantly increases, different types of systems and methods are being devised to recover and transfer energy which would otherwise be lost.

Conventional heat exchange apparatus operates in several heat recovery modes including air to gas, gas to water, and gas to organic fluids. The selection of the mode of heat recovery depends upon the characteristics of the application, the processes used by the particular industrial facility, and the economic need for a given service. For example, steam can be generated at low pressure for heating or absorption air conditioning applications, at medium pressures for processing, or at higher pressures with or without superheat for electrical power generation.

The recovery of heat energy by the generation of either high pressure or low pressure steam is probably the most common means of fuel and energy conservation because steam carries tremendous heat energy per unit weight, consisting of sensible and latent heat. Various types of heat recovery boilers are available for the recovery of heat energy by the generation of either high pressure or low pressure steam. Examples of conventional heat recovery boilers include units of straight tube banks attached to fixed or floating headers and units of serpentine (return bend) elements. The circular coil type and the horizontal serpentine element type require forced recirculation. Vertical tube units may operate in either forced or natural circulation modes. Larger low pressure heat recovery applications usually employ the natural circulation system, commonly to the two drum variety. This is essentially a closed loop system, with one leg of the loop receiving heat and the other serving as the downcomer that does not receive heat. The difference in water and steam specific volume in the heated portion relative to the water only portion in the downcomer creates a natural upflow of water and steam from the lower to the upper drum. Steam is released in the upper drum, passing through a scrubbing section for moisture removal. A given volume of water may circulate several times between the drums before it receives enough enthalpy to change phase to steam.

The multiple drum natural circulation boiler is stable, the boiling heat transfers coefficients are high, and the system has reserve water for variable demand. Among the several disadvantages inherent in this arrangement are an excessive number of tubes required for the downcomers, bent tubes are required in order to accommodate differential expansion, and the boiler drums must be thick walled for high pressure operation.

In the operation of conventional waste heat boilers, the rate of heat transfer from waste gases to the boiler water depends upon the temperature and specific heat of the gases, the velocity and direction of the gases over the heat absorbing surfaces of the boiler, and the cleanliness of the surfaces. For proper heat transfer from the waste gases to the boiler water there must be sufficient stack or an induced draft fan to overcome the draft losses due to the required flow of the gases over the heat absorbing surfaces with an allowance for fouling of these surfaces. Compared with direct firing arrangements, the gas temperatures are generally lower and consequently the radiation component in the heat transfer mechanisme is also lower. Therefore, the tendency with waste heat boilers is to design for higher gas velocity over the tubes in order to increase the convection component of heat transfer. However, a significant number of industrial processes generate a substantial amount of heated waste gas which is only available for recovery of thermal energy at relatively low flow velocities. Consequently, there exist a number of industrial processes in which recovery of waste heat by conventional heat exchangers is relatively inefficient because of the low flow velocities involved. In view of the constantly increasing cost of energy, there is a continuing need for new and improved systems for recovering waste heat which operate effectively at relatively low flow velocities.

SUMMARY OF THE INVENTION

The present invention concerns a method and apparatus for utilizing heat pipes in combination with a steam boiler for the recovery and transfer of thermal energy in a waste heat recovery system which operates effectively at low flow velocities. Heat pipes normally comprise a sealed envelope which contains a working fluid having both a liquid phase and a vapor phase in the desired range of operating temperatures. When one portion of the heat pipe is exposed to a relatively higher temperature, it functions as an evaporator section. The working fluid is vaporized in the evaporator section and flows in the vapor phase to the relatively lower temperature section of the envelope, which becomes a condenser section. The working fluid is condensed in the condenser section resulting in the transfer of thermal energy due to the phase changes of the working fluid. The condensed working fluid is then transported in a liquid phase back to the evaporator section where the process is repeated.

The use of heat pipes in combination with a steam boiler offers several advantages over conventional heat exchange arrangements. For example, the transducer characteristic of the heat pipe permits collection of heat from a diffused source such as low velocity waste gas and transfer of the heat into a concentrated thermal sink such as a volume of water. The simplicity of sealing a heat pipe through a single or double wall header plate provides complete isolation of one fluid stream from the other. Because of the single point connection, both the evaporator and condenser ends of the heat pipe extend freely thereby minimizing stress problems due to thermal expansion and contraction. Furthermore, the outside of the heat pipe is available in both fluid streams for cleaning, for extended surface fin structure, or for special surface preparation to enhance heat transfer.

Heat pipes are utilized in the present invention to recover and transfer heat energy from a stream of heated waste gas to a volume of water disposed in a boiler for the production of heated water under pressure or for the production of steam. The stream of heated waste gas is caused to flow through a convection heat transfer chamber where it is contacted by the evaporator portion of one or more heat pipes which connect the convection heat transfer chamber in thermal communication with a boiler in which a volume is disposed. The condenser end of each heat pipe projects through a header plate disposed in a side portion of the boiler tank in thermal relation with the volume of water diposed therein. A working fluid is disposed within each of the heat pipes which is characterized by a thermodynamic cycle in which the working fluid assumes the vapor phase in response to the transfer of heat energy from the heated gas phase through the evaporator section of the heat pipe, whereupon it flows from the evaporator section to the condenser section and assumes the liquid phase in the condenser section in response to the transfer of its heat energy through the condenser to the volume of water. In a preferred embodiment, the transfer of thermal energy is substantially improved by elevating the condenser section above the evaporator section thereby permitting substantial volumes of unvaporized working fluid to be transported from the evaporator section to the condenser section.

According to another important feature of the invention, a portion of the exhaust gas flow which is discharged from the convection heat transfer chamber after heat transfer has occured is circulated in a regenerative mode of operation in which the exhaust gas is directed into the input port of the convection heat transfer chamber for increasing the mass flow at a reduced velocity for optimum efficiency. The regenerative mode of operation can also be used to good advantage to reduce the temperature of the heated waste gas flow when that temperature exceeds the operating limits of the working fluid of the heat pipes. In either case, the mass flow is increased thereby enhancing the transfer of heat in the evaporator section.

According to another important feature of the invention, a superheat mode of operation is provided by connecting two or more convection heat transfer chambers in series fluid communication relation with each other. Heat pipes connect the downstream convection heat transfer chamber in thermal communication with a steam boiler tank. Steam produced by this arrangement is directed into the input of a second boiler tank where it is superheated by a second heat pipe assembly in which a condenser section is disposed within the second boiler tank in thermal relation to the stream of saturated steam and also having an evaporator section disposed in an upstream convection heat transfer chamber. The heated gas stream first passes through the upstream convection heat transfer chamber at a given temperature for raising the saturated steam to a superheated level. The flow of heated waste gas continues to the downstream convection heat transfer chamber at a lower temperature having sufficient heat energy for the generation of steam in the downstream boiler tank.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawing.

DETAILED DESCRIPTION

Figure 1:
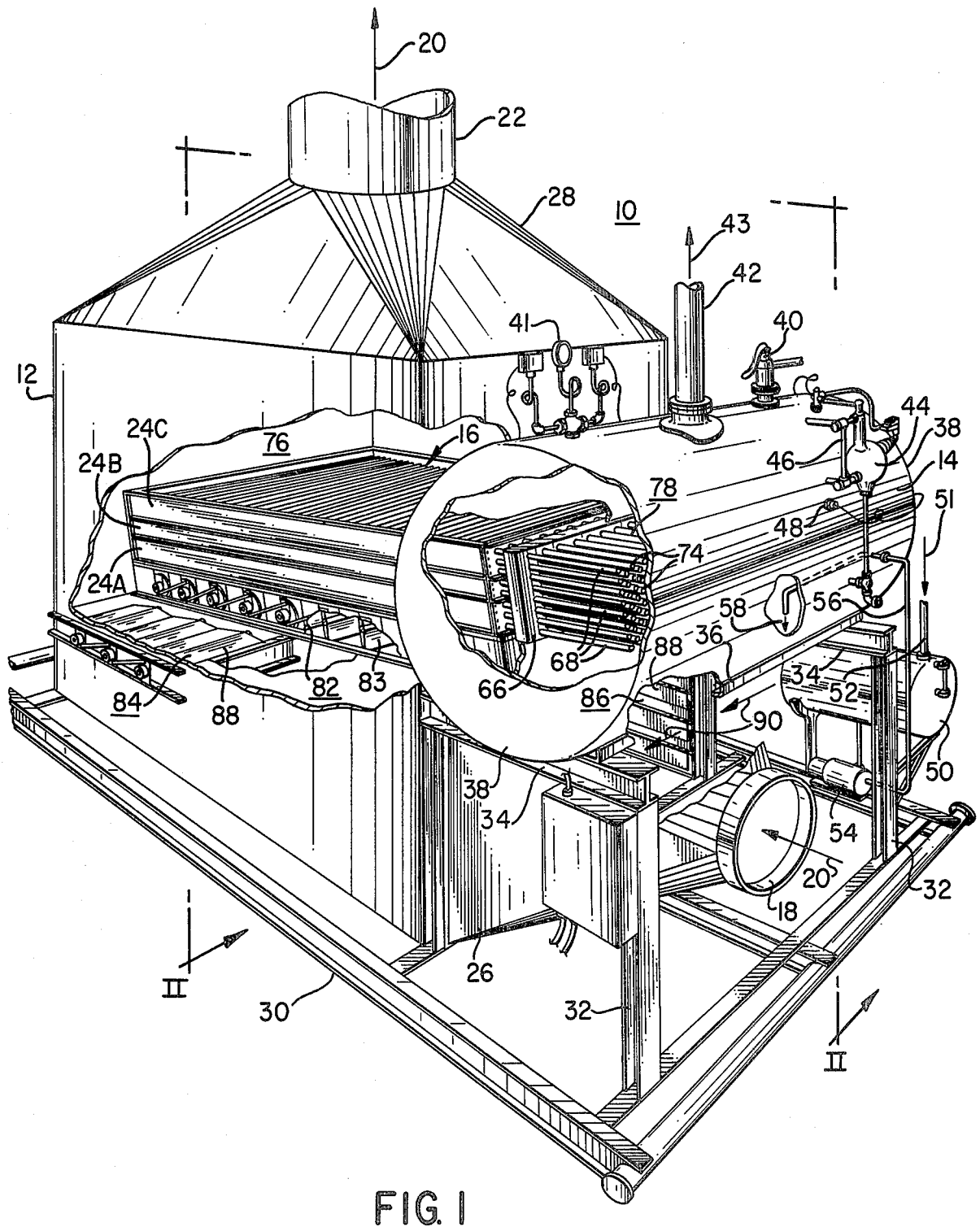
FIG. 1 is a perspective view of a waste heat recovery system constructed according to the teachings of the invention.

In the description which follows and in the several figures of the drawing, like parts are marked with the same reference numerals respectively.

Figure 2:
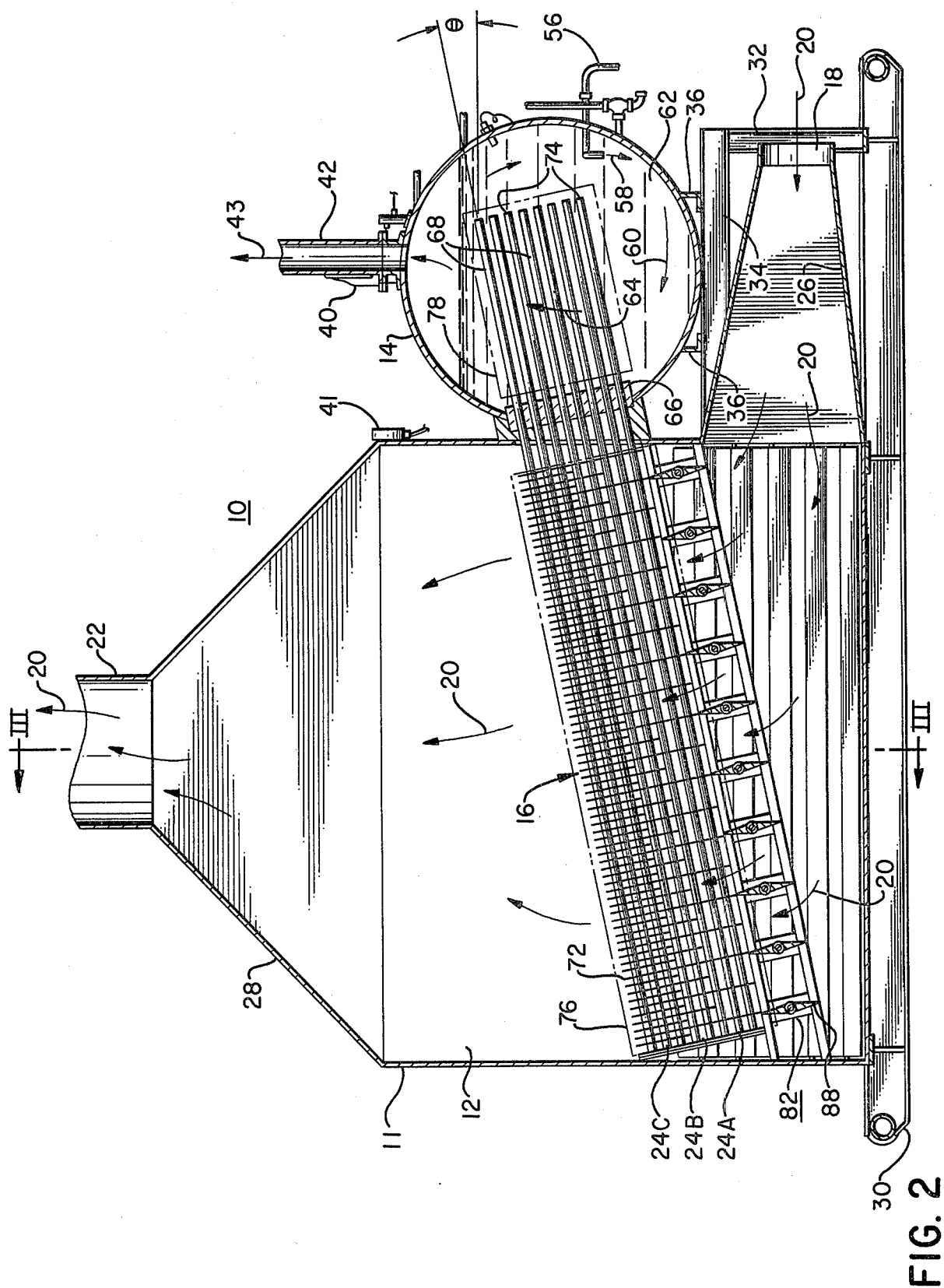
FIG. 2 is a left side view, in section, taken along the lines II—II of FIG. 1.
Figure 3:
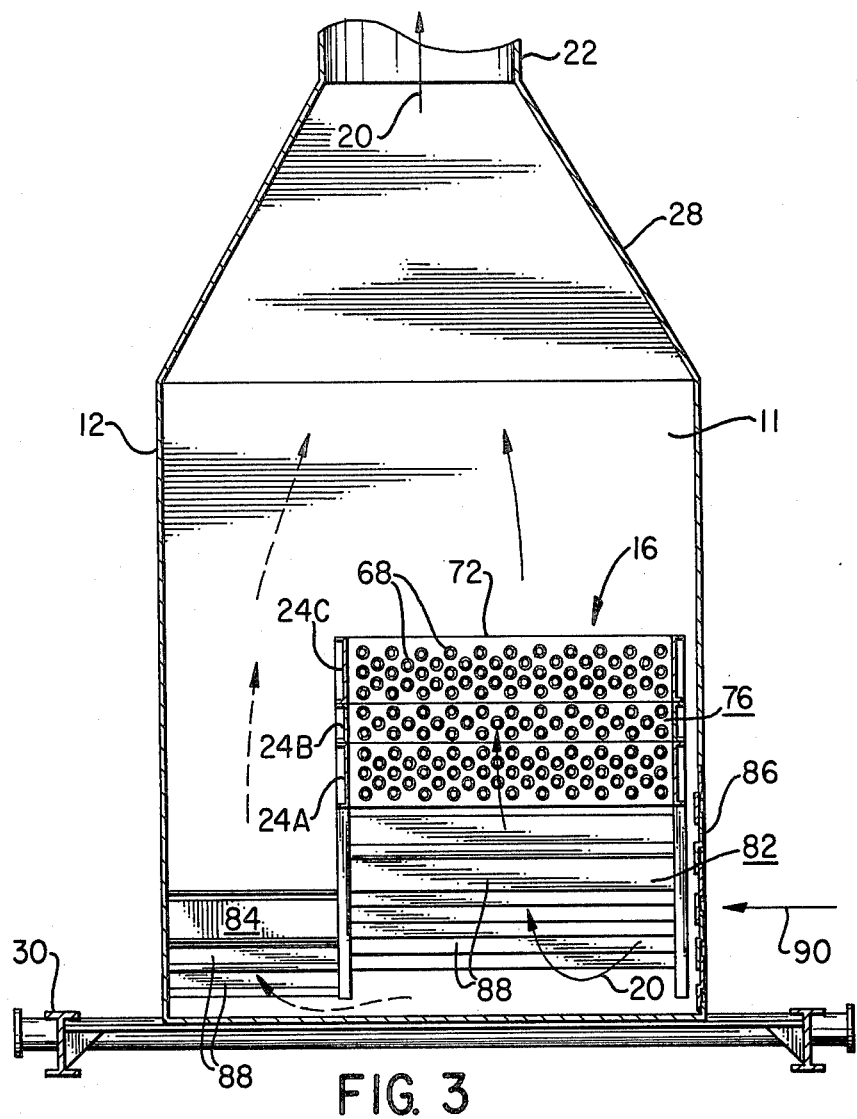
FIG. 3 is a sectional view taken along the lines III—III of FIG. 2.

Referring now to FIGS. 1-3, a heat recovery system which is constructed according to the teachings of the present invention is indicated generally by reference numeral 10. The heat recovery system 10 includes a housing 11 which encloses a convection heat transfer chamber 12, a steam boiler tank 14, and a heat pipe assembly 16 which interconnects the convection heat transfer chamber 12 and steam boiler tank 14 in thermal communication with each other. The housing 11 is equipped with an inlet port 18 through which a stream of heated waste gas, indicated by the arrow 20, flows into the convection heat transfer chamber 12 and across the heat pipe assembly 16 where thermal energy is transferred. After the thermal energy transfer has occurred, the exhaust gas flow is discharged through an exhaust port 22 to an exhaust stack by means of an induced draft fan (not shown).

The source for the heated waste gas stream 20 may be from any industrial process but for the purposes of the present discussion it will be assumed to be the exhaust from a gas turbine which is used in a total energy system to drive an alternator or a mechanical refrigeration compressor. Such a total energy system might be used to provide all power, light, heating and cooling for a hotel, school, shopping center or hospital. Gas turbine exhaust temperatures are typically in the range of 750° to 1,000° F. and therefore may be considered to be in the medium temperature range, requiring no special materials or alloy steels in the heat exchanger 16.

The housing 11 and convection heat transfer chamber 12 are generally rectangular in design having a relatively greater width than depth to accommodate the elongated evaporator sections 24 of the heat pipe assembly 16. The inlet port 18 is connected to the convection heat transfer chamber 12 by means of an inlet transition shroud 26, and the exhaust port is connected to the convection heat transfer chamber by means of an exhaust transition shroud 28. The housing 11 and convection heat transfer chamber 12 are supported at an upright position on a support skid or foundation frame 30. The steam boiler tank 14 is supported in an elevated position on the skid 30 by means of vertical I-beams 32, horizontal I-beams 34, and angle plates 36 in a position directly adjacent to the convection heat transfer chamber 12 and overlying the inlet transition shroud 26 and inlet port 18. This particular physical arrangement of the major components of the heat recovery system 10 is required because of the elongated geometry of the heat pipe assembly 16 and the requirement that the condenser section of each heat pipe be physically disposed within the steam boiler tank 14.

The steam boiler tank 14 is generally cylindrical in construction and includes hemispherical end covers 38 welded at each end. According to a typical arrangement, the waste heat recovery system is designed to produce $2 \times 10^6$ BTU per hour of saturated steam at 100 psi. Therefore a conventional construction material such as mild steel may be utilized to construct the steam boiler tank 14 for operation in this pressure range including a conservative pressure safety factor.

The steam boiler tank 14 is equipped with a conventional relief valve 40, pressure gauge 41, and a steam discharge pipe 42 for conveying steam 43 is disposed along the upper top surface of the tank. Also, the steam boiler tank 14 is equipped with a water level control 44 which includes a sight glass 56 and a low water cut-off transducer 48.

A condensate collecting tank 50 is filled by condensate 51 through a condensate return line 52 from the process which utilizes the steam generated by the system which may be, for example, a steam turbine driven alternating current generator (not shown). In certain situations, supplemental makeup water may be required where an insufficient amount of condensate is available. For this situation a separate water pre-heater (not shown) would be economical. Condensate or makeup water accumulated in the collecting tank is conveyed to the boiler tank 14 by means of a water pump 54 and a fill line 56 which projects through the side of the steam boiler tank 14 and directs the flow downwardly as indicated by the arrow 58 as can best be seen in FIGS. 1 and 2 of the drawings. This flow arrangement for water discharged into the steam boiler tank 14 helps create circular current flow within the volume of water 62 in cooperation with movement of bubbles of steam rising from the condenser end portions of the heat pipe assembly 16 as indicated by the arrow 64. The circular flow of currents within the volume of water 62 provides that incoming water will be mixed uniformly within the boiler tank thereby promoting the production of steam at a relatively constant rate. Furthermore, this inlet arrangement mixes the incoming water so that no cold streams flow directly onto weld areas which are sensitive to thermal shock.

An important feature of the steam boiler tank 14 is the provision of a pressure header plate 66 in a rectangular opening in one side of the tank. The pressure header plate 66 serves as the interface between the condenser section of the heat pipe assembly 16 which is disposed entirely within the steam boiler tank 14 and the evaporator section of the heat pipe assembly which is disposed within the convection heat transfer chamber 12. Each heat pipe in the heat pipe assembly 16 passes through a circular opening within the pressure header plate 66 and is joined to the surrounding portions of the pressure header plate by means of a conventional pressure sealing technique such as explosive bonding. The fluid-tight seal produced by this technique ensures that the heated waste gas stream and the water will be physically isolated from each other.

Figure 4:
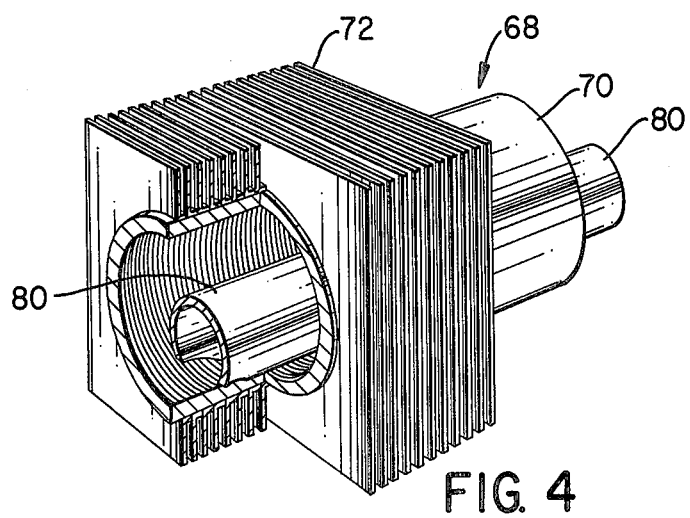
FIG. 4 is an isometric view of a portion of a heat pipe assembly utilized in the present invention.

Referring now to FIGS. 1-4, the heat pipe assembly 16 comprises a rectilinear array of heat pipes 68 which are arranged in rows and columns according to a staggered pattern. The heat pipes 68 have identical construction as illustrated in FIG. 4 and as described in U.S. Pat. No. 4,020,898 by George M. Grover and assigned to the assignee of the present invention, which is hereby incorporated by reference. Other heat pipe constructions such as illustrated in U.S. Pat. No. 3,865,184 by George M. Grover and assigned to the assignee of the present invention, which is hereby incorporated by reference, may also be used to good advantage.

The preferred heat pipe of the present invention is indicated generally at 68 in FIG. 4 of the drawing. The heat pipe includes an outer tubular envelope 70 which is typically a tubular member having a length many times greater than its cross-sectional width. The outer tubular envelope 70 will be at least about eight feet in length and will have an inside diameter of about one-half to one inch. Such dimensions are mentioned as being typical only, it being understood that the overall length and diameters of such heat pipes can vary over wide ranges depending upon the particular application. While the illustrated heat pipe 68 is shown having a generally cylindrical tubular member 70 as the outer tubular envelope, it is to be understood that various other geometric shapes may be utilized such as rectangular or square cross-sectional tubular members. However, it has been found that the cylindrical tubular member 70 can be readily and economically formed into the heat pipe 68 for use in this invention. Normally, the outer tubular member 70 is fabricated from a thermally conductive material such as copper, aluminum, or steel and the like, in order that thermal energy can be passed into and out of the interior of the heat pipe through the walls of the outer tubular member 70.

A plurality of conventional, thermally conductive heat exchanger fins 72 can be mounted at axially spaced points on the exterior of the tubular envelope 70 in such a manner as to provide good heat transfer between the fin and the envelope. This increases the effective area over which convection heat transfer occurs. Such fins have been found to increase the thermal energy transfer efficiency especially for gaseous steam-to-wall transfer. The fins can usually be eliminated where the heat exchange in made with a liquid rather than a gas. In the modular heat pipe assembly 16 as shown in FIG. 2, each of the evaporator sections 24A, 24B, and 24C contain progressively more heat exchanger fins 72 to achieve uniform heat transfer since the temperature of the heated waste gas stream decreases as it passes through each modular section. In selecting a fin arrangement, the hot gas entrained solids should be considered in selecting the external fin configuration. Natural gas fueled gas turbines produce a very clean exhaust, consequently high, closely spaced fins may be used, up to a fin spacing of ten fins per inch. Fin height, while adding to total surface, reduces fin efficiency because of the longer thermal path. High fins also increase through flow area or gas passage area. All of these factors must be balanced in a design for the most effective use of the heat pipes.

In the present example, the heat pipes 68 are typically one inch OD carbon steel arranged on two inch centers and two inches between rows in a staggered array as can best be seen in FIGS. 1 and 3 of the drawing. Preferably, eight fins 72 of 0.024 inch mild steel with an aluminized surface are explosively bonded to the outer tubular member 70. As discussed above, it may be desirable to have a different number of fins in each of the modular sections, therefore the spacing will be different for each section when a modular array is constructed. The opposite ends of the tubular member 70 are hermetically sealed by end caps 74. In the construction of the heat pipe, the tubular envelope 70 is evacuated through a fitting provided on the end cap 74. Thereafter, the envelope 70 is filled with a liquid phase/vapor phase working fluid (not shown) such as a commercial refrigerant R12 or toluene. The end cap 74 is the permanently sealed by crimping, soldering or welding.

The quantity of working fluid that is utilized in the heat pipe has been found to be relatively important for efficient operation. It has been determined that the heat transfer capability of the heat pipes 68 is maximized if the quantity of the working fluid in the heat pipe is such that the liquid phase is present in an amount of from about 40 to about 75 percent of the volume of the tubular envelope 22 at the desired operating temperatures.

The end portions of each heat pipe 68 which are disposed wholly within the convection heat transfer chamber 12 collectively constitute an evaporator section as indicated by the dashed line 76. The opposite end sections of each heat pipe 68 which are wholly disposed within the steam boiler tank 14 collectively constitute a condenser section for the heat pipe assembly 16 as illustrated by the dashed line 78 as can best be seen in FIG. 2 of the drawing. The heat pipe assembly 16 transfers very large quantities of thermal energy between the evaporator section 76 and the condenser section 78 by the closed cycle movement of the working fluid as it is vaporized in the evaporator section and moves to the condenser section where it is condensed and returns to the evaporator.

It has been discovered that the magnitude of the thermal energy which can be exchanged for a given arragy of heat pipes can be increased by elevating the condenser section 78 at an angle $\theta$ with respect to the evaporator section 76 as shown in FIG. 2. According to this arrangement, at least a portion of the working fluid liquid contained within the evaporator section will be vaporized and the vaporized portion will rise to the relatively cool condensor section of the heat pipe assembly where it is condensed and returns by gravity flow. Because of the phase change of the working fluid from a liquid to a vapor and then back to a liquid, large quantities of thermal energy are transferred between the evaporator section and the condenser section of the heat pipe.

Referring again to FIG. 4, a liquid phase return conduit or flow separator 80 is disposed within the tubular envelope 70 and extends from the evaporator section 76 to the condenser section 78. The liquid phase return conduit 80 is a conduit that preferably has open ends to allow liquid phase working fluid to flow into the upper end of the liquid phase return conduit and then downwardly through the conduit to exit out the lower open end of the conduit into the evaporator section of the heat pipe. Thus the liquid phase of the working fluid that is either swept or transported upwardly into the condenser section 78, as well as the liquid phase which forms upon the condensation of the vaporized working fluid in the condenser section, will enter the open end of the liquid phase return conduit 80 and will flow by gravity downwardly to the evaporator section wherein additional thermal energy, passing through the walls of the evaporator section, will cause evaporation of a portion of the working fluid with the vaporized portion flowing upwardly to the condenser section 78 in the space surrounding the outside of the liquid phase return conduit.

It has been determined that the heat pipe-flow separator combination described above is characterized by two distinctly different operating modes depending upon the angle of inclination of the heat pipe relative to the horizontal. These two operating modes are the evaporation/condensation mode and the "bubble" mode in which long bubbles of vapor displace slugs of liquid from the evaporatorsection to the condenser section. This reduces the vapor transport because the velocity of the bubbles is substantially less than that of a pure vapor stream. On the other hand, the transport of liquid is greatly increased. Since there is a finite temperature drop along the pipe, there is a large increase in the sensible heat transferred to compensate for the decrease in latent heat transfer associated with the decreased vapor being transported. For angles of inclination up to about 35° the heat pipe-flow separator combination operates in the evaporation/condensation mode, has good efficiency and a capacity several times greater than the non-flow separator heat pipe. At higher angles of inclination the capacity increases more slowly. For the waste heat boiler described herein, the temperature difference between the waste heat gas stream and the desired steam temperature is small, therefore high efficiency is desirable, and operation at angles of inclination at or below 35 degrees is preferred.

Thus, it will be appreciated that vaporized portions of the working fluid, along with some of the liquid phase working fluid, will flow upwardly in the space outside of the liquid phase return conduit while only liquid phase working fluid will flow downwardly through the liquid phase return conduit. This distinct circulation pattern is achieved by utilizing the liquid phase return conduit 80 which provides a separate flow path with respect to the outer tubular envelopes 70, thereby thermally isolating the walls of the outer tubular envelope 70 with respect to the condensate working fluid which is conveyed through the liquid phase return conduit 80. The liquid phase return conduit 80 is, of course, not a pressure member and may be formed of any suitable material, such as thin walled metal tubes of copper, aluminum, steel or the like. The preferred length of the liquid phase return conduit 80 is from about 65 to about 85 percent of the length of the interior of the outer tubular envelope 70. In some instances, especially at higher angles of inclination , the liquid phase return conduit 80 can be shortened somewhat in the evaporator section and may extend into the evaporator section for a distance of down to about 15 percent of the length of the evaporator section.

Under ideal conditions, the heated waste gas stream 20 would be provided by a clean source of hot air. However, in a practical application of the present invention it should be expected that the heated waste gas 20 will be composed of air, combustion products, ash carryover, and other contaminants. Therefore, the heat pipe assembly 16 must be cleaned periodically to prevent fouling of the heat transfer fins 72. Conventional soot blowers (not shown) can be utilized for this purpose. For cleaning the interior of the steam boiler tank 14, one of the hemispherical end covers 38 may be provided with a bolted flange access plate (not shown) to permit quick removal for cleaning and inspection of the condenser assembly 78.

Flow of the heated waste gas stream 20 through the convection heat transfer chamber 12 is regulated by means of a face damper assembly 82, a bypass damper assembly 84 and an ambient air damper assembly 86.

The face damper and bypass damper assemblies are substantially identical in construction and include a number of adjustable vanes 88 which are generally horizontally disposed within the convection heat transfer chamber 12. The face damper 82 assembly extends beneath the evaporator section 76 of the heat pipe assembly 16 and when closed completely blocks the flow of air through the evaporator section. Operation of the face damper assembly 82 in the closed position is desirable in an emergency situation brought about by a low water or a high pressure cutout alarm. When this occurs, the face damper assembly is closed and the bypass damper 84 is completely opened thereby permitting the heated gas stream 20 to flow around the evaporator section 76 and through the exhaust port 22 substantially without exchanging heat with the evaporator section. The vanes 88 also serve to promote heat transfer by causing turbulent flow of the heated gas stream 20 through the evaporator section 76.

According to another important feature of the invention, the ambient air damper assembly 86 is provided in order to admit the flow of ambient air as represented by the arrow 90 in FIG. 1 into the convection heat transfer chamber 12 when it is desired to reduce the temperature of the incoming heated waste gas stream 20 and also to increase the mass flow across the evaporator section 76.

Figure 5:
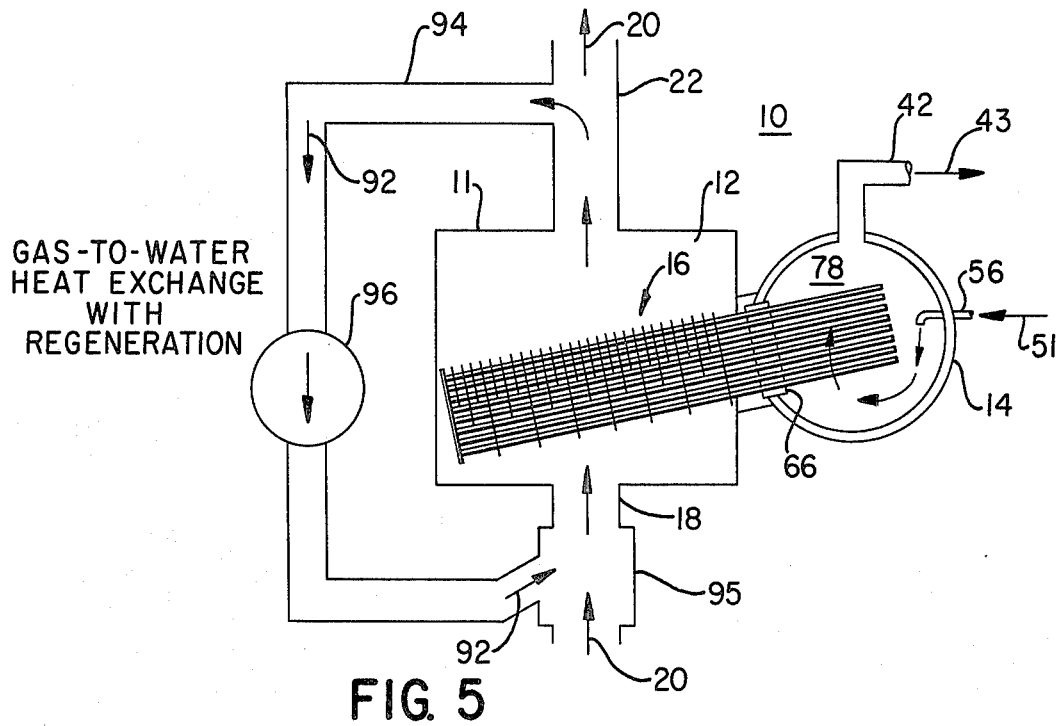
FIG. 5 is a block diagram which illustrates a regenerative mode of operation of the present invention; and, FIG. 6 is a block diagram which illustrates the combination of two heat recovery systems of the present invention in a superheat mode of operation.

Referring now to FIG. 5 of the drawing, the waste heat recovery system 10 is illustrated in a gas-to-water heat exchange arrangement with regeneration of exhaust waste gas flow after heat exchange has taken place. This arrangement is typically utilized when the incoming heated waste gas flow 20 is at a temperature above the effective operating range of the heat pipe assembly 16. The temperature is reduced and the mass flow is increased by recycling a fraction of the heated waste gas stream 20 after it has passed through the convection heat transfer chamber 12. A fraction 92 of the exhaust heated waste gas stream 20 is circulated through a regeneration conduit 94 which is connected in fluid communication with the exhaust port 22. The fraction 92 of the waste gas stream 20 is circulated by a forced draft fan 96 through the regeneration conduit 94 which is connected at its other end in fluid communication with the inlet port 18. The fraction 92 preferably is mixed with the incoming flow 20 in a mixing chamber 95 so that the temperature of the incoming flow 20 is reduced to an operating temperature which is compatible with the operating range of the working fluid. The magnitude of the fraction 92 of the waste gas stream which is recycled may be controlled by adjusting the speed of the forced draft fan 96. The advantage provided by this regenerative arrangement is that the mass flow of waste gas passing across the evaporator section 76 is increased while the temperature may be lowered to a level which corresponds to optimum operation of the working fluid selected for the system.

In an important application of the heat recovery system of the present invention, superheated steam may be produced by connecting the exhaust port 22 of a first convection heat transfer chamber designated as 12U, referring to its position as being upstream relative to the inlet port 18 of a second convection heat transfer chamber 12D, referring to its relative position as being downstream. The first and second convection heat transfer chambers 12U, 12D are connected in series fluid communication with each other whereby the heated waste gas stream 22 first passes over the evaporator section 76 of the upstream convection heat transfer chamber 12U and then passes over the evaporator section 76 of the downstream convection heat transfer chamber 12D whereupon it is conveyed through the exhaust port 22 to be discharged into the atmosphere. According to this arrangement, a substantial amount of heat is transferred in the evaporator section 76 in the upstream convection heat transfer chamber 12U, for example at temperatures of 1000° F. and above for producing superheated steam, and thereafter transferring heat at a substantially reduced temperature, for example in the range of 700° or lower in the downstream convection heat transfer chamber 12D for producing saturated steam. The working fluid in each of the evaporator sections is of course chosen to be compatible with the expected operating temperature range. Saturated steam is conducted through the steam discharge pipe 42 to the boiler tank 14U of the upstream heat recovery system 10. There the saturated steam flows over a condenser section 78U which may include fins 72 for enhancing the heat transfer, thereby producing superheated steam which is conveyed through a superheated steam discharge pipe 98.

Any known working fluid that will exist in both a liquid and vapor phase under the operating temperatures and pressures can be utilized in the present invention. Thus, working fluid such as water, aliphatic hydrocarbons, aromatic hydrocarbons, halogen substituted materials, such as freon, refrigerants and the like, can be used. Particularly preferred working fluids are the freon materials such as refrigerant R12, benzene, toluene and the like.

It is preferred that the heat pipes 68 of the heat pipe assembly 16 generally comprise straight tubular pipes. In this preferred embodiment, the heat pipes 68 in the heat pipe assembly 16 are disposed in parallel with each other and the assembly is oriented whereby the axis of each heat pipe will be inclined at an angle $\theta$ above the horizontal to position the condenser section 78 above the evaporator section 76 (see FIG. 2). It has been found that the preferred range of the angle of inclination is between about 15 degrees to about 35 degrees above the horizontal.

From the foregoing discussion, it will be appreciated that the present invention comprises a unique waste heat recovery system having substantially improved operating characteristics over conventional systems. The modular arrangement of the heat pipe assembly 16 permits each evaporator section 24A, 24B and 24C to contain different numbers of fins 72. Since the temperature of the heated waste gas stream 20 decreases as it passes through each modular evaporator section of the evaporator 76 the first evaporator section 24A will need fewer fins 72 than the last evaporator section 24C in order that the heat pipes in each evaporator section will transfer substantially the same quantity of heat. This freedom of choice of fin area for the modular evaporator sections permits many evaporator sections to be stacked to that the amount of heat transferred from the waste gas stream can be maximized.

Figure 6:
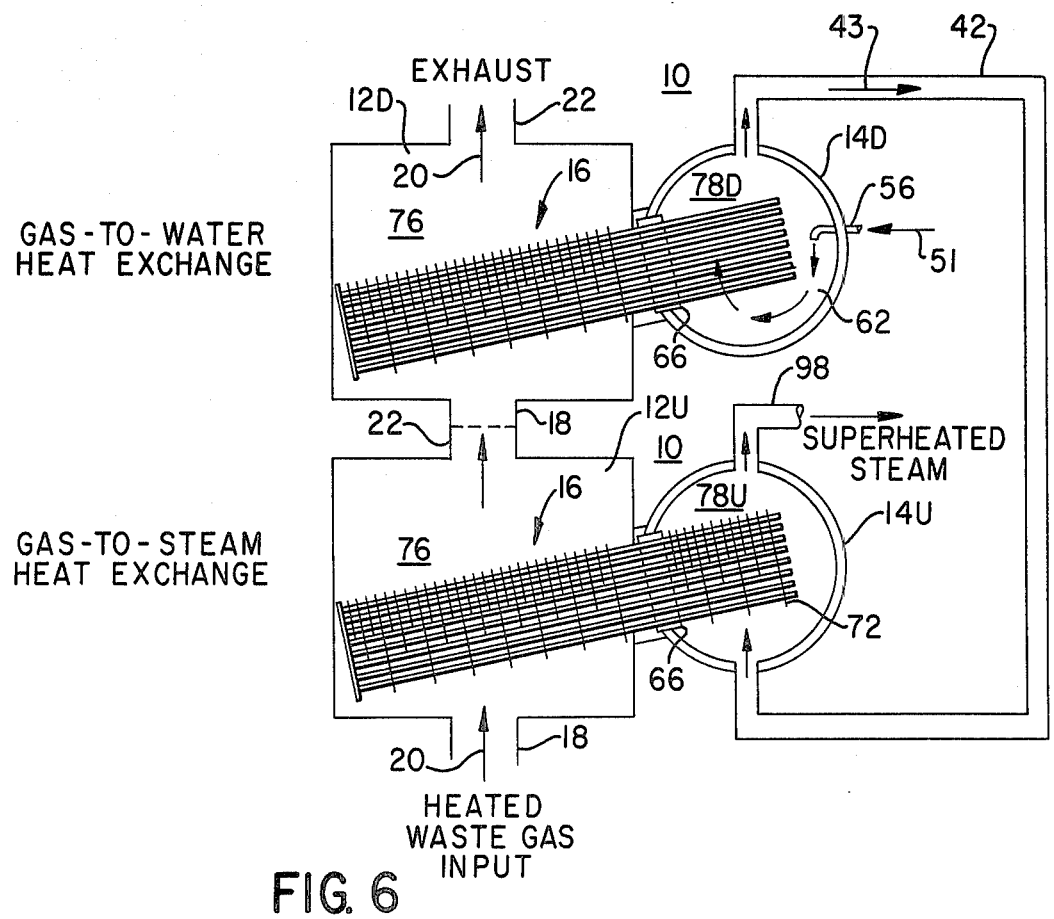

Another important advantage over the prior art is that the heat pipes extend freely into the boiler tank 14 and are sealed into the header plate 66 which permits free expansion without mechanical strain. Furthermore, the outside portions of the heat pipes in the condenser section can be grooved or knurled to provide a heat transfer surface which enhances nucleate boiling of the water at the heat transfer surface. Also, because the heat pipes are freely extended, fins may be attached to the condenser section end portions for superheat applications as illustrated in FIG. 6 of the drawing. Because tubes are not terminated in a manifold, it is possible to clean the heat transfer surfaces at regular maintenance intervals to keep the heat transfer surface in excellent condition.

The volume at the bottom of the boiler tank 14 conveniently serves as a "mud drum" volume, and additional flush-clean holes may be provided at various places in the tank to permit cleaning without complete disassembly. One of the end cover plates can be sealed against the end of the boiler tank 14 by a bolted flange construction which allows quick removal for cleaning and inspection.

For certain applications, the boiler tank 14 may be used for purposes other than steam production. For instance, the system may be used for vaporization of a flammable working fluid such as toluene for a waste heat Rankine cycle power system which requires complete isolation from the heated gas stream. Otherwise there would be an extremely hazardous possibility of venting the flammable material into the hot gas stream in the event of a leak of the system. Complete isolation is provided by the union of the header plate 66 with each of the heat pipes 68 which are closed at their end portions and which operate at relatively low pressures.

The structure and operation of the heat pipe boiler of the present waste recovery system is analagous to a "single ended fire tube" boiler arrangement. It has the advantages of simplicity of construction, stability of operation, cleaning accessibility and reserve for demand variations. In addition, there is complete isolation of one fluid stream from the other. The performance of the waste heat recovery system as a steam boiler is relatively high. Approximately 80 to 85 percent of the usable heat from a 1000° F. gas stream can be used to produce 100 psia steam. In other words, the 1000° gas stream can be cooled to about 450° F. in this stream boiler arrangement.

Although a preferred embodiment of the invention has been described in detail, it should be understood that various changes, substitutions, and alterations can be made therein without departing from the spirit and scope of the invention as defined by the appended claims.

What is claimed is:

1. Apparatus for transferring heat energy from a flowing stream of heated gas to produce superheated steam comprising, in combination:
   first and second convection heat transfer chambers connected in series fluid communication with each other;
   a saturated steam boiler tank associated with the downstream convection heat transfer chamber having a water inlet port, a steam discharge port, and a header plate forming a side wall portion for receiving heat pipes for producing saturated steam;
   a superheated steam boiler tank associated with the upstream convection heat transfer chamber having a saturated steam inlet port, a superheated steam discharge port, and a header plate for receiving heat pipes for producing superheated steam;
   a first group of heat pipes thermally interconnecting the saturated steam boiler tank with the downstream convection heat transfer chamber, each heat pipe of the first group including an evaporater section disposed within the downstream convection heat transfer chamber in the flow path of the heated gas stream and having a condenser section disposed within the interior of the saturated steam boiler tank, each heat pipe of the first group having a first sealed end portion terminating within the downstream heat transfer chamber, a second sealed end portion terminating within the saturated steam boiler tank, an intermediate portion projecting through the associated header plate, and each heat pipe containing a working fluid having a vapor phase and a liquid phase at the operating temperatures of the downstream evaporator section and saturated steam condenser sections, respectively;
   a second group of heat pipes thermally interconnecting the superheated steam boiler tank with the upstream convection heat transfer chamber, each heat pipe of the second group including an evaporator section disposed with the upstream convection heat transfer chamber in the flow path of the heated gas stream and having a condenser section disposed within the interior of the superheated steam boiler tank, each heat pipe of the second group having a first sealed end portion terminating within the upstream heat transfer chamber, a second sealed end portion terminating within the superheated steam boiler tank, an intermediate portion projecting through the associated header plate, and each heat pipe containing a working fluid having a vapor phase and a liquid phase at the operating temperatures of the upstream evaporator section and the superheated steam condenser sections, respectively; and,
   the saturated steam discharge port of the saturated steam boiler tank being connected to the saturated steam inlet port of the superheated steam boiler tank for discharging saturated steam over the condenser sections of the upsteam heat pipes.

2. A method of producing superheated steam by the recovery of heat energy from a stream of heated waste gas comprising the steps:
   discharging the stream of heated waste gas through upstream and downstream convection heat transfer chambers which are connected in series fluid communication with each other;
   producing saturated steam in a first boiler tank by transferring heat energy from the heated waste gas stream to a volume of water contained within the first boiler tank by means of a first array of heat pipes each having an evaporator section disposed in the flow path defined by the downstream convection heat transfer chamber, a condenser section disposed in heat transfer relation with the volume of water in the first boiler tank, and a volume of working fluid carried through each heat pipe of the first array in closed cycle circulation between the downstream evaporator and condenser sections in response to heat energy transfer to and from the downstream evaporator and condenser sections, respectively;
   discharging saturated steam produced by the first boiler tank into a second boiler tank; and,
   producing superheated steam in the second boiler tank by transferring heat energy from the heated waste gas stream to the saturated steam discharged into the second boiler tank by means of a second array of heat pipes each having an evaporator section disposed in the flow path defined up the upstream convection heat transfer chamber, a condenser section disposed in heat transfer relation with the saturated steam discharged in the second boiler tank, and a volume of working fluid carried through each heat pipe of the second array of heat pipes in closed cycle circulation between the upstream evaporator and condenser sections in response to heat energy transfer to and from the upstream evaporator and condenser sections, respectively.

3. In combination, a boiler tank having a water inlet port, a steam discharge port, and a header plate forming a side wall portion of the boiler tank;

a convection heat transfer chamber having an inlet duct for receiving a flowing stream of heated gs and an outlet duct for exhausting the gas stream;

a group of heat pipes thermally interconnecting the boiler tank with the heat transfer chamber, each heat pipe including an evaporator section disposed within the heat transfer chamber in the flow path of the heated gas stream and having a condenser section disposed within the interior of the boiler tank, each heat pipe having a first sealed end portion terminating within the heat transfer chamber, a second sealed end portion terminating within the boiler tank, an intermediate portion projecting through the header plate, and each heat pipe containing a working fluid having a vapor phase and a liquid phase at the operating temperatures of the evaporator and condenser sections, respectively; and, a regeneration conduit having an inlet port connected in fluid communication with the outlet duct of the convection chamber, an outlet port connected in fluid communication with the inlet duct of the convection chamber, and a forced draft fan disposed in the regeneration conduit for recirculating a fractional flow of the heated gas stream discharged from the convection heat transfer chamber.

4. A method of producing steam by the recovery of heat energy from a stream of heated waste gas comprising the steps:

discharging the stream of heated waste gas over the evaporator sections of an array of heat pipes having a plurality of evaporator sections disposed in spaced relation to each other with respect to the direction of waste gas flow within a convection heat exchange chamber, a corresponding number of condenser sections similarly disposed in spaced relation within a steam vessel, and a volume of working fluid carried in each heat pipe in closed cycle circulation between the evaporator section and the condenser section in response to heat energy transfer to and from the evaporator and condenser sections, respectively, exposing the condenser sections of the array in intimate contact with a volume of water disposed within the pressure vessel;

discharging steam from the vessel as it is produced and replacing the water converted into steam by discharging makeup water into the vessel;

discharging the stream of heated waste gas through the convection heat exchange chamber in such a manner that the heated waste gas stream passes in thermal contact with the heat pipes of the lowermost evaporator section prior to passing in thermal contact with the heat pipes of the uppermost evaporator section;

and, discharging makeup water into the steam vessel in a direction which enhances the circulation of liquid convection currents which are produced by the transfer of heat from the heat pipes of the condenser sections to the surrounding volume of water whereby the liquid convection currents pass in thermal contact with the heat pipes of the lowermost condenser section prior to passing in thermal contact with the heat pipes of the uppermost condenser section.

5. The method of producing steam as defined in claim 4 further including the step of maintaining each heat pipe of the array at an oblique angle of inclination with respect to the horizontal.

6. The method as defined in claim 4, the array of heat pipes including a plurality of evaporator sections disposed in spaced relation to each other with respect to the direction of fluid flow within the convection heat exchange chamber, the method including the step of equalizing the amount of heat transferred in the lowermost evaporator section relative to the amount of heat transferred in intermediate and uppermost evaporator sections by discharging the stream of heated waste gas through the convection heat exchange chamber in such a manner that the heated waste gas stream passes in thermal contact with the heat pipes of the lowermost evaporator section prior to passing in thermal contact with the heat pipes of the uppermost evaporator section, the heated waste gas stream being discharged over an increasingly larger number of heat transfer fins attached to the heat pipes of each evaporator section as it flows from the lowermost evaporator section to the uppermost evaporator section.

7. A method of producing steam by the recovery of heat energy from a stream of heated waste gas comprising the steps:

discharging the stream of heated waste gas over the evaporator sections of an array of heat pipes each having an evaporator section disposed within a convection heat exchange chamber, including an inlet port for receiving the flow of heated waste gas and an outlet port for discharging the heated waste gas stream after it has passed over the evaporator section, a condenser section disposed within a steam vessel, and a volume of working fluid carried through the heat pipe in closed cycle circulation between the evaporator section and the condenser section in response to heat energy transfer to and from the evaporator and condenser sections, respectively;

exposing the condenser sections of the array in intimate contact with a volume of water disposed within the pressure vessel;

discharging steam from the vessel as it is produced and replacing the water converted into steam by discharging makeup water into the vessel; and circulating a fractional flow of the heated gas stream discharged from the outlet port through the inlet port in a regenerative operating mode whereby the mass flow of the heated waste gas passing across the evaporator section is increased by the fractional flow.

* * * * *

UNITED STATES PATENT AND TRADEMARK OFFICE
CERTIFICATE OF CORRECTION

PATENT NO. : 4,482,004
DATED : November 13, 1984
INVENTOR(S) : George M. Grover

It is certified that error appears in the above-identified patent and that said Letters Patent is hereby corrected as shown below:

Column 2, line 14, "mechanisme" should be --mechanism--.

Column 8, line 8, "evaporatorsection" should be --evaporator section--.

Column 10, line 9, "substantiallyre-" should be --substantially reduced--.

Column 13, line 13, "gs" should be --gas--.

Signed and Sealed this

Ninth Day of April 1985

[SEAL]

Attest:

DONALD J. QUIGG

Attesting Officer

Acting Commissioner of Patents and Trademarks